Patented Jan. 27, 1931

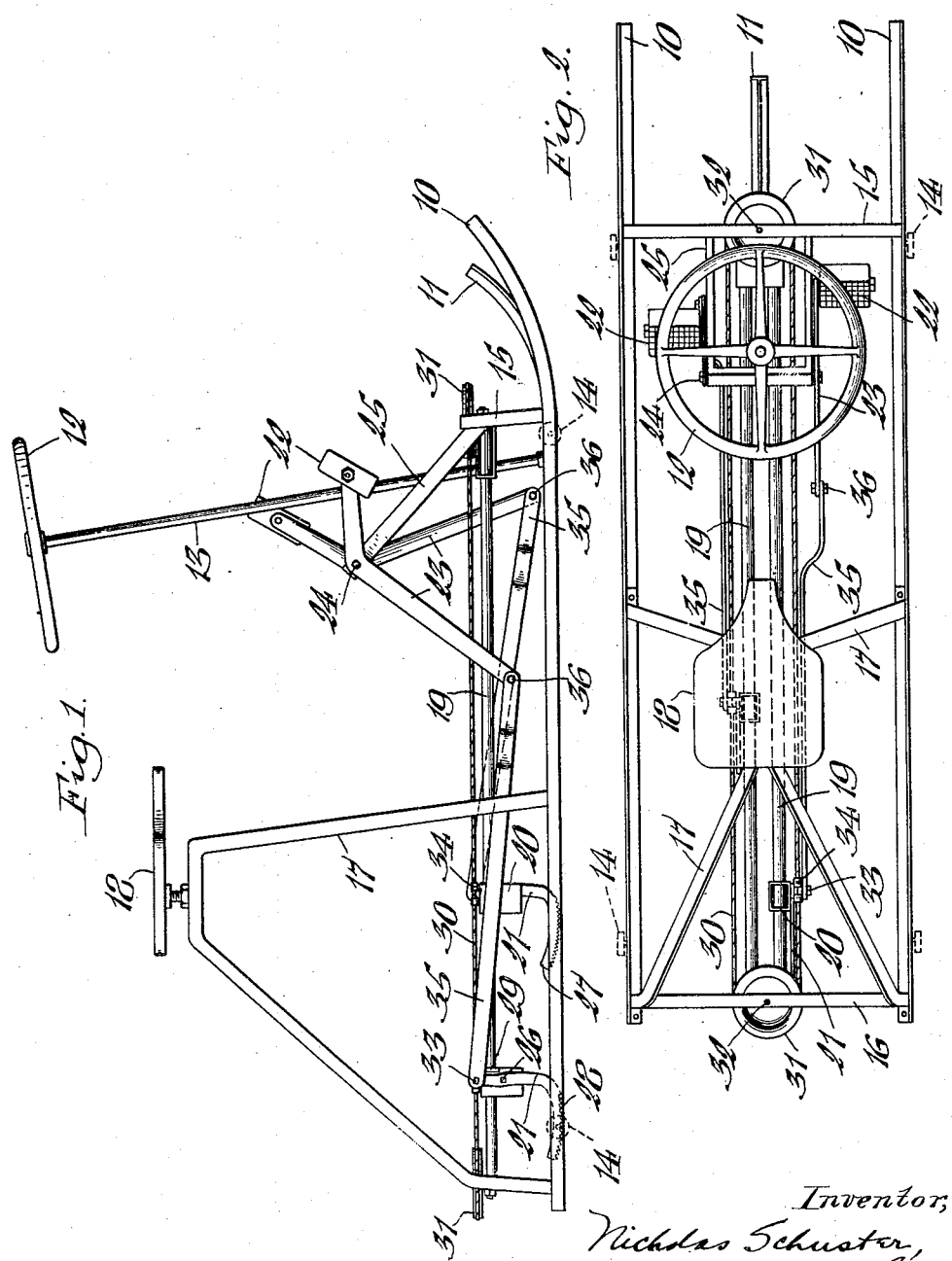

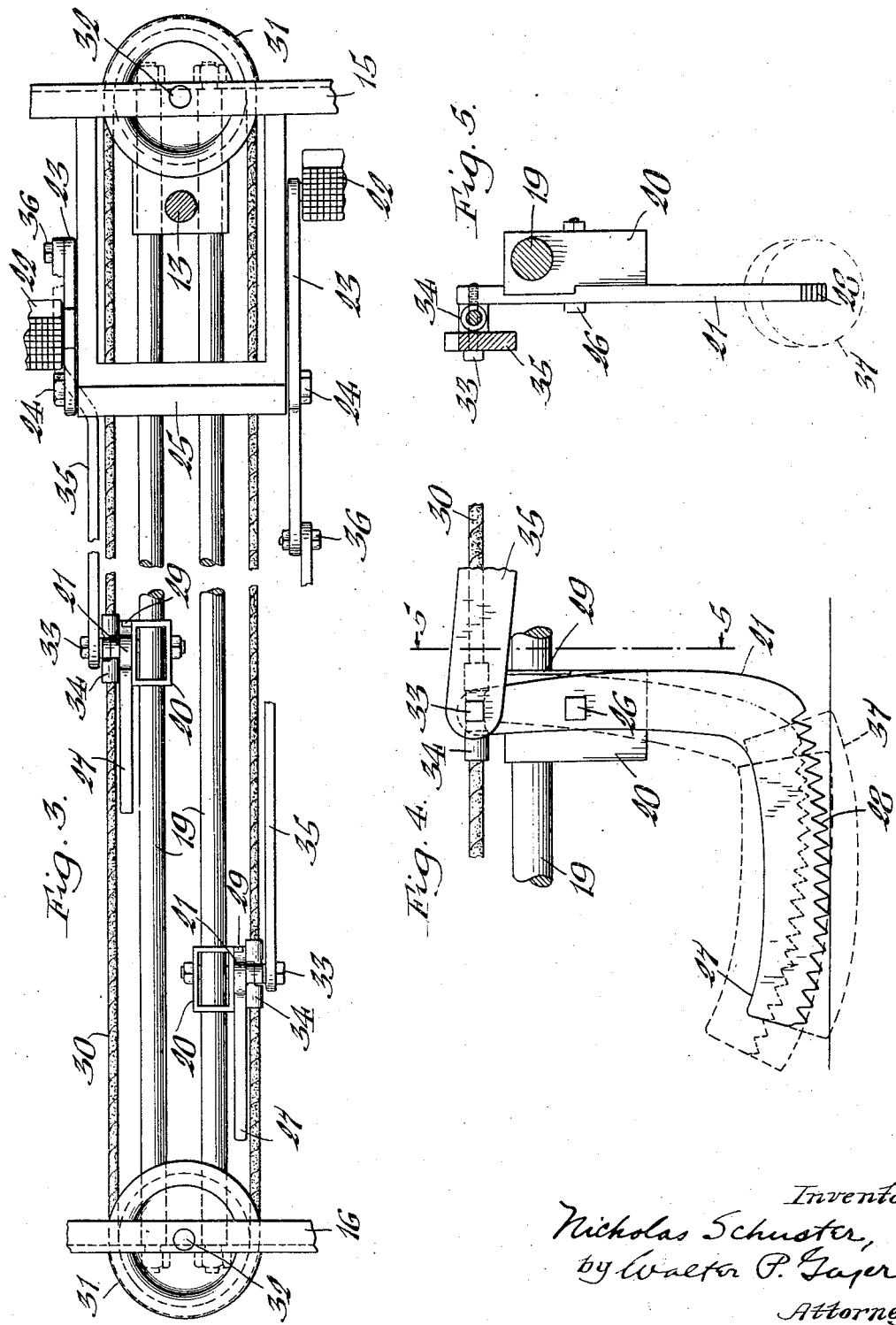

1,790,026

UNITED STATES PATENT OFFICE

NICHOLAS SCHUSTER, OF BUFFALO, NEW YORK

CHILD'S VEHICLE

Application filed January 17, 1930. Serial No. 421,421.

This invention relates to improvements in self-driven vehicles and more particularly to a child's vehicle which is adapted for propulsion by the rider over the street or sidewalk or over ice or snow.

One of its objects is to improve the actuating mechanism of the vehicle with a view of assuring a uniform motion thereof over the ground and also to afford an easier propulsion thereof by the child.

Another object of the invention is to provide a child's vehicle of this character which is simple, compact and inexpensive in construction, and whose parts are so organized and arranged as to provide for a maximum of comfort and reliability of operation.

In the accompanying drawings:—

Figure 1 is a side elevation of a child's vehicle embodying my improvements. Figure 2 is a top plan view thereof. Figure 3 is an enlarged, fragmentary top plan view, partly in section, showing the disposition of the actuating mechanism of the vehicle. Figure 4 is an enlarged side elevation of one of the propelling elements and its associated parts. Figure 5 is a transverse section taken on line 5—5, Figure 4.

Similar characters of reference indicate corresponding parts throughout the several views.

In the preferred embodiment of the invention shown in the drawings, the same comprises spaced, longitudinal frame bars 10, 10 which may be in the form of sleigh runners, as shown, and a steering member or runner 11 actuated by a steering wheel 12 attached to an inclined post 13 rising from the steering runner. When it is desired to use the vehicle on sidewalks or pavements, it may be equipped with wheels or casters 14, shown by dotted lines in the drawings. Connecting the front and rear ends of the frame bars are cross members or braces 15 and 16, respectively, and intermediate these members are substantially upright supports 17 to which a suitable seat 18 for the rider is fastened.

Disposed lengthwise of the vehicle in spaced parallel relation above the frame bars 10 are horizontal guide rods 19 supported at their front and rear ends in the corresponding cross braces 15, 16. Slidably mounted on these guide rods for alternate reciprocating movement are cross-heads or slide-blocks 20 which carry depending propelling elements 21 and which are actuated back and forth to propel the vehicle by foot pedals 22 applied to the short upper arms of vertically-swinging elbow levers 23 fulcrumed intermediate their ends, as indicated at 24, to a substantially U-shaped bar or yoke 25 rising upwardly and rearwardly from the front cross brace 15. As shown in Figure 1, the foot pedals are disposed above the guide rods 19 and the longer lower arms of the levers 23 are arranged obliquely to their upper arms.

The propelling elements 21 are preferably substantially L-shaped, each being pivoted at its upper end, as indicated at 26, to the corresponding slide-block 20, while the rearwardly-bent portion 27 is provided at its lower edge with gripping teeth 28 which are adapted to bite into the ice or snow to propel the vehicle thereover. Projecting laterally from the side of each slide-block is a stop lug or flange 29 which is arranged in the path of movement of the projecting upper arm of the propelling element to limit its rearwardly-swinging movement. In its rearwardly swung position, the gripping end of the propelling element is clear of the ice or snow and inactive.

The slide-blocks 20 and the propelling elements 21 carried thereby are adapted to be reciprocated in opposite directions for the purpose of alternately bringing these elements into and out of gripping engagement with the ground as the rider actuates the pedals 22 to propel the vehicle in a forward direction. The preferred means for thus actuating the slide-blocks consists of an endless belt or cable 30 disposed in a horizontal plane lengthwise of the vehicle and immediately above the guide rods 19, the front and rear ends of the cable passing around pulleys 31 journaled on upright studs 32 secured to the front and rear cross braces 15, 16. One of the longitudinal stretches of this cable is pivotally joined, as indicated at 33, to the upper arm of the corresponding propelling element 21 through the medium of a jointed coupling 34, while the other stretch thereof is similarly joined to the companion propelling element. The pedal levers 23 are adapted to transmit oscillatory movement to the endless cable 30 to reciprocate the propelling elements 21, and for this purpose the lower arms of these levers are connected by rigid links 35 with the corresponding upper arms of said propelling elements. The front end of each link is pivoted at 36 to its companion pedal-lever while its rear end may be joined to the same pivot member 33 which connects the cable with the propelling element. As seen in Figure 1, the relative length of the lower pedal lever arm and its companion link are such that in the extreme forward position of the pedal 22, the respective pivots 24, 33 and 36 are out of a dead center line, thereby insuring a positive and rigid gripping action of the propelling elements on the ground-surface and resulting in an uniform movement of the vehicle thereover.

In the operation of the vehicle as the child alternately applies foot pressure to the pedals 22, the elbow levers 23 are thrust forward and backward to move the endless cable 30 first in one direction and then in the other to bring the propelling elements 21 into and out of operative engagement with the ice or snow, one of such elements traveling in a rearward direction in its gripping position to push the vehicle forwardly and the other element simultaneously traveling in the opposite or forward direction and assuming the rearwardly inclined position shown by dotted lines in Figure 4, wherein it is out of engagement with the ground. When pressure is applied, say to the right hand foot lever 23, its lower arm is moved rearwardly to shift the endless cable and the corresponding slide-block 20 with its propelling element in a like direction, the latter being simultaneously swung about its pivot 26 to bring it into gripping engagement with the ground. The companion foot lever on the other side of the vehicle is, during this movement, compelled to rock in the opposite direction by reason of its connection to the other side of the endless cable and the companion propelling element is swung in a direction to bring its gripping edge clear of the ground with its upper arm abutting against the stop flange 29 on the corresponding slide-block.

In using the device as a wheeled vehicle, the toothed portions 27 of the propelling elements 21 may be provided with rubber or similar ground-gripping shoes 37 which may be detachably fitted to such portions.

I claim as my invention:—

1. A self-propelled vehicle, comprising a frame, a horizontally-disposed endless belt extending lengthwise thereof, reciprocating slides guided for movement lengthwise of the frame alongside the stretches of said belt, pendant ground-engaging elements fulcrumed to said slides and joined to said belts above their fulcrums, pedal levers fulcrumed intermediate their ends on said frame for vertically-swinging movement, and links connecting the lower arms of said pedal levers with said ground-engaging elements.

2. A self-propelled vehicle, comprising a frame, a horizontally-disposed endless belt extending lengthwise thereof, reciprocating slides guided for movement lengthwise of the frame alongside the stretches of said belt, pendant ground-engaging elements fulcrumed intermediate their ends to said slides to swing in a longitudinal direction into and out of engagement with the ground and joined at their upper ends to said belt above their fulcrums, pedal levers fulcrumed intermediate their ends on said frame for vertically-swinging movement, and links pivotally connecting the lower arms of said pedal levers with the upper arms of said ground-engaging elements.

3. A self-propelled vehicle, comprising a frame, a horizontally-disposed endless belt extending lengthwise thereof, slides guided on said frame alongside the stretches of the belt for alternately reciprocating movement, propelling elements pivotally suspended intermediate their upper and lower ends from said slides to swing in a longitudinal direction into and out of gripping engagement with the ground, the upper arms of said propelling elements being pivotally joined to the endless belt, alternately movable elbow levers fulcrumed on said frame above the belt and forwardly of the propelling elements, the upper arms of said levers having foot pedals thereon and their lower arms extending below said belt, and rigid links connecting the lower arms of said elbow levers with the upper arms of said propelling elements for transmitting motion to the belt to reciprocate the slides and for controlling the swinging movements of said elements to their operative and inoperative positions.

4. A self-propelled vehicle, comprising a frame, horizontally-disposed pulleys journaled at the front and rear ends of the frame, an endless belt passing around said pulleys, guide rods arranged lengthwise of the vehicle between the side stretches of the belt, slides mounted on the guide rods for alternately reciprocating movement, propelling elements pivotally suspended intermediate their upper and lower ends from said slides to swing in a longitudinal direction into and out of gripping engagement with the ground, the upper arms of said propelling elements being joined to the endless belt, alternate movable foot levers fulcrumed intermediate their ends on said frame forwardly of the propelling elements and including upper and lower obliquely-disposed arms, the upper arms being arranged above the belt and the lower arms extending below the same, and rigid links connecting the lower arms of said foot levers with the upper arms of said propelling elements.

NICHOLAS SCHUSTER.